(12) United States Patent
Tiwary et al.

(10) Patent No.: US 10,521,086 B1
(45) Date of Patent: Dec. 31, 2019

(54) FRAME INTERPOLATION FOR MEDIA STREAMING

(71) Applicant: AMAZON TECHNOLOGIES, INC., Reno, NV (US)

(72) Inventors: Shinjan Kumar Tiwary, Sunnyvale, CA (US); Sreeram Raju Chakrovorthy, Campbell, CA (US); Sapna Jayaram Rai, Campbell, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 633 days.

(21) Appl. No.: 14/109,077

(22) Filed: Dec. 17, 2013

(51) Int. Cl.
*G06F 3/0484* (2013.01)
*H04N 21/2343* (2011.01)

(52) U.S. Cl.
CPC ... *G06F 3/0484* (2013.01); *H04N 21/234363* (2013.01); *H04N 21/234381* (2013.01)

(58) Field of Classification Search
CPC .... H04N 21/234381; H04N 21/234363; G06F 3/0484

USPC .................................................. 725/90, 117
See application file for complete search history.

(56) References Cited

U.S. PATENT DOCUMENTS

| | | | |
|---|---|---|---|
| 8,588,299 B1* | 11/2013 | Yeo ........................ | H04N 19/33 375/240.12 |
| 2005/0108764 A1* | 5/2005 | Rosenberg ........... | H04N 19/176 725/90 |
| 2008/0263012 A1* | 10/2008 | Jones ................ | G06F 17/30811 |
| 2010/0195977 A1* | 8/2010 | Bennett .............. | H04N 21/2343 386/201 |
| 2014/0269930 A1* | 9/2014 | Robinson ........... | H04N 21/2365 375/240.24 |
| 2014/0289263 A1* | 9/2014 | Otala ................ | G06F 17/30247 707/752 |

* cited by examiner

*Primary Examiner* — James R Sheleheda
*Assistant Examiner* — Franklin S Andramuno
(74) *Attorney, Agent, or Firm* — Lindauer Law, PLLC

(57) ABSTRACT

A variety of media devices may stream and present content such as movies, music, audiobooks, and so forth. During streaming, changing conditions or unavailable frames may result in stutters or other presentation problems. Described herein are techniques and systems for extrapolating one or more frames based on previously received data. The interpolated frames may be presented, reducing or eliminating the presentation problems.

20 Claims, 12 Drawing Sheets

FRAME INTERPOLATION FOR MEDIA STREAMING

BACKGROUND

A wide variety of content is available for streaming delivery to media devices for presentation. The content may include audio, video, or both. The media devices may include televisions, set-top boxes, tablet computers, personal computers, gaming consoles, in-vehicle entertainment systems, portable media players, and so forth.

Traditionally, changing conditions, missing or corrupt frames, and so forth may result in "stutters" or other problems associated with presentation of the content. These problems may result in an undesirable user experience.

Figure 1:
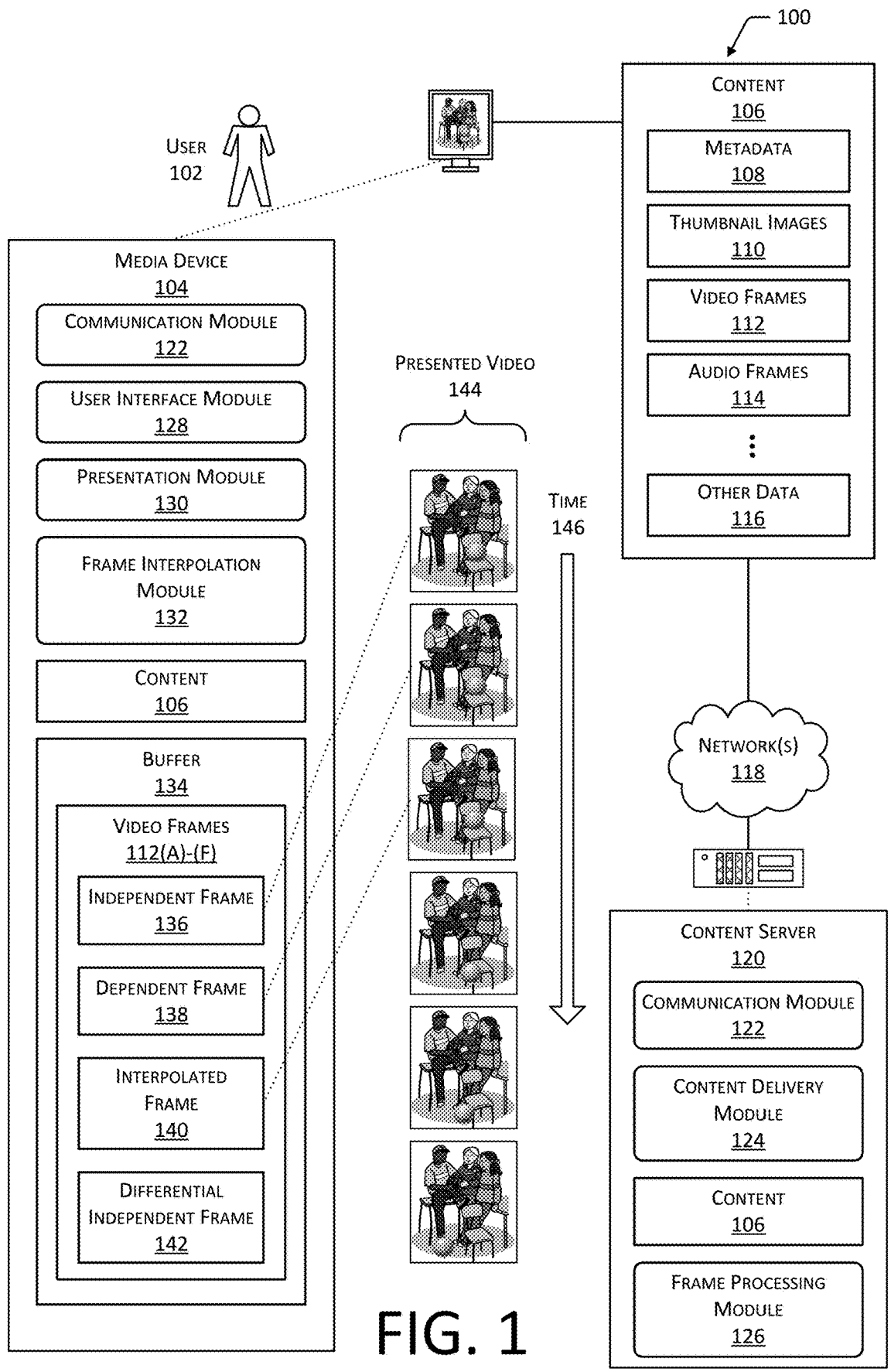
FIG. 1 is an illustrative system for video presentation using interpolated frames.

Certain implementations and embodiments will now be described more fully below with reference to the accompanying figures ("FIGS."), in which various aspects are shown. However, various aspects may be implemented in many different forms and should not be construed as limited to the implementations set forth herein. Like reference numbers refer to like elements throughout.

DETAILED DESCRIPTION

Media devices present content to one or more users. The content may include audio, video, or both. For example, the content may include television shows, movies, audio books, and so forth.

The content may be streamed from one or more content servers to the media device. The media device may then present the content to the one or more users. Streaming comprises an incremental ongoing transmission of portions of the content. As portions are received, presentation may take place. Streaming allows for presentation to begin before the entire file has been downloaded. Streaming offers several advantages compared to local storage of the entire file of the content. Local storage requirements of the media device are reduced, lowering cost of the device. Content publishers or owners may be better able to determine content consumption statistics such as how many times a movie has been watched. Digital rights management may also be more easily applied and updated, helping to maintain intellectual property rights in the content.

Streaming utilizes a connection to the one or more content servers to receive portions of the content for presentation. The connection between the media device and the one or more content servers may use one or more networks. A data transfer rate (or "bandwidth") between the media device and the one or more content servers may change from time to time. These changes in bandwidth may result from changes in network routing, congestion at one or more points along the network, and so forth. For example, the data transfer rate may be 1.5 megabits per seconds ("Mbps") at time=0, drop to 0.75 Mbps at time=1, and increase to 1.6 Mbps at time=2. "Bit" or "bits" as used in this disclosure are indicative of a quantity of data transferred, stored, or otherwise manipulated for ease of discussion and not as a limitation. For example, the quantity of data may be expressed as bytes.

Video content may comprise a plurality of frames. A display output device presents these frames in sequence to produce apparent motion. Frame rates of between 15 frames per second or more may be used to provide video. For example, a frame rate of 60 frames per second ("fps") presents 60 frames in sequence for every second, with each frame presented on the display output device for about 1/60 of a second, or about 16.6 milliseconds ("ms").

For presentation of the video content to be maintained without dropouts, stutters, or other presentation anomalies, the frames are delivered to the media device, and ultimately the display output device, without interruption. Various situations may result in dropouts, such as changes in bandwidth, corrupt data resulting in unusable frames, delays in delivery of frames, and so forth.

To maintain presentation, the media device may buffer a portion of the streamed content. For example, the video frames received from the one or more content servers are stored in memory. Presentation may then use the buffered video frames. Over time, the buffer is refilled with additional video frames received from the one or more content servers. Without this refill, the buffer is exhausted and presentation is starved for video frames to present.

Content servers may use techniques such as adaptive bitrate streaming ("ABS") to mitigate problems associated with changing bandwidth. ABS responds to changes in the bandwidth by transitioning between different versions of the content based on the bandwidth available. Each of these different versions may provide content of different quality. In one implementation, the different versions of the content may include a low quality low bitrate stream, a medium quality medium bitrate stream, and a high quality high bitrate stream.

ABS may attempt to estimate future bandwidth, and adjust the quality or resolution of the content delivered to the media device to fit this estimation. Typically these estimations are pessimistic, which may result in unnecessary transitions to lower quality streams of the content. Furthermore, transitions from one quality of content to another may result in stutter or dropout. For example, a transition from video encoded at a high quality (such as a bitrate of 2400 Kbps) to video encoded at a low quality (such as a bitrate of 500 kbps) may result in a momentary interruption of the video presented to the user by the media device as frames associated with the low quality are stored in the buffer.

Other situations may result in stutters or other presentation anomalies. For example, video frames may be delivered late, that is, after the appropriate time for presentation has passed. In another example, video frames may be corrupt or unusable. In traditional systems unavailable frames, such as frames which have not yet been delivered, frames which are corrupt or otherwise unusable, and so forth may result in stutters. For example, frames may not yet have been delivered due to a transition from one quality of a stream to another, resulting in a stutter. This results in an undesirable user experience, interrupting the user's consumption of the content.

Described in this disclosure are techniques for maintaining presentation of video content when unavailable frames are encountered during presentation. Several techniques are described below in which interpolated frames of video are generated to replace or "fill in" for the unavailable frames of video. Audio content may be received in advance of presentation and presented as well.

Video may be encoded using independent frames and dependent frames. Independent frames comprise information configured to present an image without reference to another frame. In comparison, dependent frames comprise information configured to present an image based on another frame, such as an independent frame, another dependent frame, and so forth. The use of independent and dependent frames may reduce the bandwidth required to deliver the video content, relative to "raw" or uncompressed data.

In one implementation, video may be encoded using the MPEG-2 standard promulgated by the Motion Pictures Experts Group ("MPEG") or the H.264 standard developed by the Video Coding Experts Group ("VCEG") and the MPEG. In these standards, "intra frames" or "I-frames" are independent frames, while "P frames" and "B frames" are dependent frames.

A first interpolation implementation provides for out-of-sequence advance delivery of independent frames. In this implementation a first independent frame is delivered, followed by or contemporaneously with, a second or future independent frame. For example, the second independent frame may be delivered contemporaneously with the dependent frames associated with the first independent frame. Should frames between the first independent frame and the second independent frame be unavailable, a frame interpolation module on the media device may generate interpolated frames for use. These interpolated frames may be based on the previously received dependent frames as well as the second independent frame.

A second interpolation implementation generates interpolated frames using thumbnail images ("thumbnails"). The content server may generate thumbnail images from source frames of the video content. The thumbnail images may be used for various purposes, such as a user interface allowing the user to see different points in the content for purposes of fast forwarding or rewinding through the content. The thumbnail images may be generated by downsampling the source frame to a lower resolution. In some implementations the thumbnails may be generated from independent frames, dependent frames, or both. The overall size in bytes of a thumbnail image is typically less than the source frame. As a result, many thumbnail images may be transmitted using less bandwidth than the associated source frames. As a result, thumbnails for future portions of the content are available at a given time.

The second interpolation implementation described herein uses the thumbnails and previously received frames such as the independent frames and source frames in the buffer to generate interpolated frames. For example, the thumbnails may be used to provide information suitable for motion estimation of objects in the frames. The motion estimation may be used to provide input for optical flow determinations suitable for use in generating the interpolated frames.

A third interpolation implementation described in this disclosure uses differential independent frames and corresponding thumbnail images to generate interpolated frames. The content server, or another device, may process source frames by generating thumbnail images. These thumbnail images may comprise low resolution or low image frequency data of the corresponding source frames. As described above, the thumbnail image may have a lower resolution compared to the source image. In some implementations the low image frequency data may correspond to relatively large, coarse portions of the image expressed in the source frame, such as overall shapes and colors of mountains in an image of a landscape.

The thumbnail image may be upsampled to the resolution of the original source frame to generate an upsampled thumbnail image. A differential independent frame is determined by taking a difference between the source frame and the corresponding upsampled thumbnail image. For example, values in the upsampled thumbnail image may be subtracted from the source frame to create the differential independent frame. The differential independent frames thus comprise the higher resolution or high image frequency data of the corresponding source frames. In some implementations the high image frequency data may correspond to smaller features or finder detail of the image expressed in the source frame, such as individual branches on trees in the image of the landscape.

The differential independent frame, the thumbnail image, or both may be further compressed using one or more techniques. For example, these frames may be compressed using wavelet compression techniques. A device such as the media device may receive the different independent frames, the corresponding thumbnail images, and may combine the two to recreate the independent frame. Using this technique, additional compression techniques may be used to further reduce bandwidth requirements without modifying underlying standards associated with the content. For example, MPEG2 encoded data may be processed to produce differential independent frames and thumbnails, which may be further compressed using wavelet compression techniques to reduce data transfer size. After receipt by the media device, the independent frames of the MPEG2 data are reconstructed and provided to the MPEG2-compliant decoder for subsequent presentation.

Interpolated frames may be generated in the third interpolation technique based on one or more of the independent frames reconstructed from the differential independent frames, the thumbnails, previously received dependent frames, and so forth. In some implementations, the differential independent frames may be delivered out of order, as described above with regard to the first interpolation technique. For example, a first differential independent frame, a second differential independent frame, and thumbnails may be provided to the media device before the dependent frames of the first differential independent frame are sent.

By extrapolating frames, the media device may reduce the incidence of stutters, dropouts, or other presentation anomalies. This reduction may improve the user experience while consuming streaming content, particularly in situations where the bandwidth between the media device and the content server varies or is of uncertain quality.

Illustrative System

FIG. 1 is an illustrative system 100 for video presentation using interpolated frames. A user 102 is depicted with a corresponding media device 104 to present content 106 for consumption. While a single user 102 and a single media device 104 is shown, more than one user 102 may consume the content 106 at a given time, such as where multiple users 102 are watching the content 106 together.

The media devices 104 may include televisions, tablet computers, personal computers, set-top boxes, gaming consoles, in-vehicle entertainment systems, portable media players, and so forth. The media device 104 includes or is communicatively coupled to one or more display output devices suitable for presenting video.

The media device 104 may be coupled to a remote control using a communication link. The remote control may serve as an input device or input/output device for the media device 104. For example, the remote control may include one or more of a touch sensor, button, accelerometer, gyroscope, camera, microphone, speaker, haptic output device, and so forth. The communication link may be optical, radio frequency, acoustic, and so forth. In one implementation the communication link may use a personal area network interface, such as one compliant with the Bluetooth specification. In some implementations the remote control may comprise another device such as a smartphone, tablet computer, and so forth which is communicatively coupled to the media device 104.

The content 106 may comprise metadata 108, thumbnail images 110 ("thumbnails"), video frames 112, audio frames 114, and other data 116. The metadata 108 comprises information about the content 106. For example, the metadata 108 may specify frame size in bits for a particular video frame 112. In some implementations the metadata 108 may include information such as motion estimation data, image interpolation data, and so forth. The metadata 108 may be embedded or encoded within, or associated with, the thumbnails 110, video frame 112, stored as a separate file, and so forth. In some implementations the metadata 108 may include sequencing information, indicative of a relative order of the video frames 112, audio frames 114, or both.

The thumbnails 110 may comprise still images based on images in the video frames 112 at different points within a stream of the video frames 112. For example, the thumbnails 110 may contain sample images at two second intervals in the video frames 112, every fifteen frames, on a scene change, based on independent frames, and so forth. The thumbnails 110 are discussed in more detail below. The thumbnails 110 may represent the image at a resolution which is less than that of the video frames 112. For example, the video frames 112 may have a pixel resolution of 1920× 1080 pixels (width×height), while the thumbnails may have a pixel resolution of 640×480. Resolution may include pixel resolution indicating the number of pixels comprising the image, spectral resolution indicating the ability to distinguish between light of different wavelengths, temporal resolution such as frames per second, and so forth. In some implementations the thumbnails 110 may have the same resolution as the video frames, but may use a different image encoding scheme, may encode less information, and so forth. For example, the video frames 112 may encode images using a color depth of 22 bits per pixel while the thumbnails 110 may encode the images using 8 bits per pixel. As a result, the bit size of the thumbnails 110 may be smaller than the corresponding video frame 112.

The video frames 112 comprise data representative of an image, or a part of an image. A plurality of video frames 112 are configured for presentation in sequence on a display output device of the media device 104. The video frames 112 may be encoded using one or more encoding schemes. These encoding schemes may include data compression. In one implementation the video frames 112 may be encoded such that they are decodable as described in the MPEG-2 standard promulgated by the Motion Pictures Experts Group ("MPEG"). In another implementation, the video frames 112 may be encoded using the H.264 standard developed by the Video Coding Experts Group ("VCEG") and the MPEG. The video frames 112 are discussed in more detail below.

The audio frames 114 comprise audio information which may be associated with the video frames 112. For example, the audio frames 114 may be encoded using the MP2 MPEG-1 or MPEG-2 Audio Layer II format promulgated by the MPEG.

The other data 116 may be included in the content 106. For example, the other data 116 may include information associated with one or more digital rights management schemes.

The media device 104 may receive content 106 streamed over one or more networks 118 from one or more content servers 120. The one or more networks 118 may include one or more public networks such as the Internet, private networks, or a combination of both. The network 118 in turn couples to a plurality of content servers 120(1), 120(2), . . . , 120(S). As used in this disclosure, a letter within parenthesis such as "(S)" represents an integer value greater than zero. While a single content server 120 ("server") is depicted, in some implementations the server 120 or the functions attributed to the server 120 may be provided by a plurality of devices. For example, the server 120 may exist as a virtualized server executing across a plurality of physical servers.

The content server 120 may provide functions such as streaming content 106 to the media device 104 for presentation, generating thumbnails 110, authenticating user accounts, providing content lists, and so forth. The content server 120 may store, or have access to, one or more pieces of content 106. The content 106 may be provided using the network 118 to the media device 104.

The content server 120 may include a communication module 122 configured to establish and support communications with the media device 104 or other devices. For example, the communication module 122 may execute instructions which support transmission of data across a data network using the transmission control protocol/internet protocol ("TCP/IP").

A content delivery module 124 is configured to stream the content 106 to one or more of the media devices 104. The streaming of the content 106 may be initiated by a request from the media device 104, by the content server 120, or another device.

A frame processing module 126 is configured to process the content 106 to generate thumbnails, differential independent frames, and so forth. The frame processing module 126 may operate in conjunction with the content delivery module 124 to deliver video frames 112 out-of-order, such as delivering a plurality of independent frames contemporaneously. Operation of the frame processing module 126 is discussed in more detail below.

One or more of the conditions on the content server 120, the network 118, the media device 104, and so forth may affect the streaming and presentation of the content 106. For example, data congestion on the network 118 may impact bandwidth resulting in late or undelivered video frames 112.

The media device 104 may also have a communication module 122 configured to establish and support communications with the server 120, other media devices 104, or other devices. A user interface module 128 of the media device 104 is configured to provide a user interface to the user 102 and accept inputs responsive to the user interface. The user interface may include one or more visual, audible, or haptic elements. For example, the user interface may be configured to provide a graphical user interface using the display which includes a control to navigate within the content 106.

A presentation module 130 is configured to present content 106 on, or in conjunction with, the media device 104. The presentation module 130 may be configured to receive streamed content 106 from an external source device such as the content server 120, another media device 104, and so forth. The presentation module 130 may support digital rights management, presentation of encrypted content, and so forth. The presentation module 130 may be configured to work in conjunction with the user interface module 128 to allow the user 102 to control presentation of the content 106.

A frame interpolation module 132 is configured to generate one or more interpolated frames for use by the presentation module 130. The presentation module 130 may request interpolated frames to use in place of one or more frames determined to be unavailable for presentation. In some implementations the frame interpolation module 132 may regularly or continuously generate interpolated frames 140, such that they are available for use should the need arise. In other implementations, the generation may be performed upon demand. The frame interpolation module 132 may generate information indicative of a confidence level in the interpolated frames. For example, this confidence level may be used to maintain a particular quality of service ("QoS"). In this example, frames having a low confidence level may be discarded and not presented when it has been deemed a better user experience to have a dropout in presentation rather than presenting low quality images. In some implementations the frame interpolation module 132 may also extrapolate. The frame interpolation module 132 is discussed in more detail below.

The video frames 112(A)-(F) received by the media device 104 may be stored in the buffer 134 prior to presentation by the presentation module 130. The video frames 112 received by the media device 104 may be stored regardless of whether the individual video frames 112 have expired, been delayed past a maximum time limit, and so forth. For example, video frames 112 which have been delivered too late for timely presentation may be stored in the buffer 134 for use by the frame interpolation module 132. The buffer 134 may be configured to fill and empty the video frames 112 in a first-in-first-out fashion.

The buffer 134 may be configured to store a fixed amount of data, or may vary in size during operation. For example, the buffer 134 may be dynamically adjusted during operation to increase or decrease the number of video frames 112 which may be stored. In some implementations, the size of the buffer 134 may be based on the metadata 108, status of the media device 104, and so forth.

The video frames 112 may include independent frames 136, dependent frames 138, interpolated frames 140, differential independent frames 142, and so forth. The independent frames 136 comprise information configured to present an image without reference to another frame. For example, with regard to video frames 112 which are encoded compliant to the MPEG2 or H.264 standards, the independent frames 136 may comprise "intra frames" or "I frames". In comparison, the dependent frames 138 comprise information configured to present an image based on another frame, such as an independent frame 136, another dependent frame 138, and so forth. Interpolated frames 140 are frames which have been generated by the frame interpolation module 132. The interpolated frames 140 may be based on video frames 112 available in the buffer 134, thumbnails 110, and so forth. The techniques used to generate the interpolated frames 140 are described below with regard to FIGS. 4-12.

The differential independent frames 142 are received from the content server 120, and may be used in conjunction with associated thumbnails 110 to generate independent frames 136. The differential independent frames 142 are discussed in more detail below with regard to FIGS. 8-12.

The presentation module 130 is configured to access the buffer 134 and present independent frames 136, dependent frames 138, interpolated frames 140, and so forth to provide presented video 144. These frames are presented in time sequence as indicated by the arrow 146, such that the video presentation progresses in typical fashion.

As illustrated here, the presented video 144 includes the independent frames 136, the dependent frames 138, and the interpolated frames 140. The presentation module 130 may request interpolated frames 140 from the frame interpolation module 132 responsive to a determination that one or more frames are unavailable. By presenting the interpolated frames 140, stutters or other presentation anomalies are avoided, which may improve the user experience while consuming the content 106.

Figure 2:
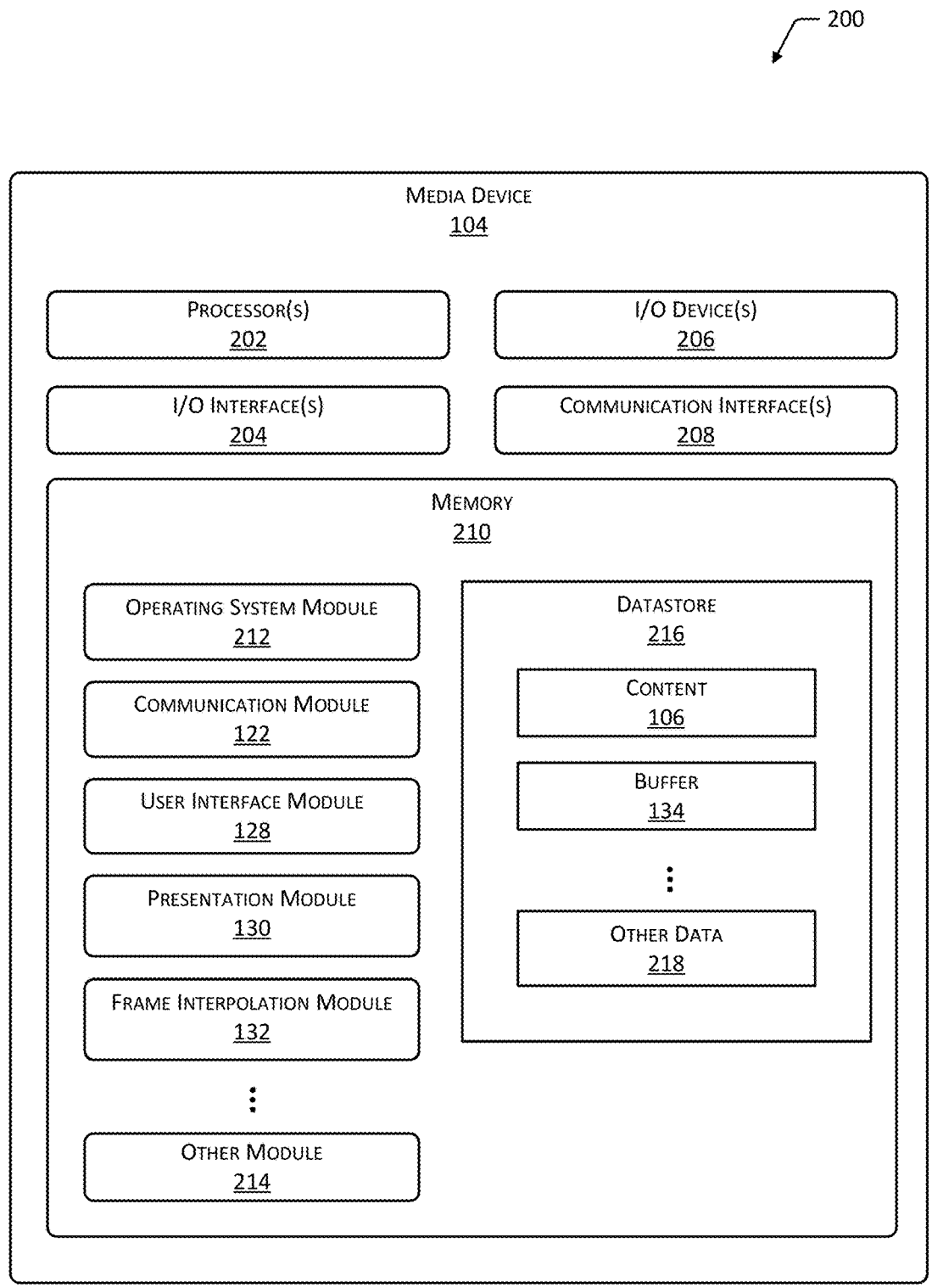
FIG. 2 illustrates a block diagram of a media device configured to provide presented video with one or more interpolated frames.

FIG. 2 illustrates a block diagram 200 of the media device 104. As described above, the media device 104 may be configured to generate interpolated frames 140 for presentation.

The media device 104 may include one or more processors 202 configured to execute one or more stored instructions. The processors 202 may comprise one or more cores. The media device 104 may include one or more input/output ("I/O") interface(s) 204 to allow the processor 202 or other portions of the media device 104 to communicate with other devices. The I/O interfaces 204 may comprise inter-integrated circuit ("I2C"), serial peripheral interface bus ("SPI"), USB, RS-232, a media device interface such as high definition multimedia interface ("HDMI"), and so forth.

The I/O interface(s) 204 may couple to one or more I/O devices 206. The I/O devices 206 may include input devices such as one or more of a camera, a microphone, a touch sensor, a button, and so forth. The I/O devices 206 may also include output devices such as one or more of a display, audio speakers, haptic output devices, and so forth. In some embodiments, the I/O devices 206 may be physically incorporated with the media device 104 or may be externally placed and communicatively coupled thereto.

The I/O interfaces 204 may include one or more media device interfaces. The media device interfaces allow for the exchange of information between the media device 104 and other media devices 104. The media device interface may include one or more of a HDMI, TOSLINK, Ethernet, analog video, analog audio, IEEE 1394, USB, Bluetooth, ZigBee, and so forth. The media device interfaces may allow for wired or wireless communication between the media device 104 and the other media devices 104.

The media device 104 may also include one or more communication interfaces 208. The communication interfaces 208 are configured to provide communications between the media device 104 and other devices. The communication interfaces 208 may include personal area networks, wireless local area networks, wireless wide area networks, and so forth. The media device 104 may communicate with the remote control using one or more of the communication interfaces 208. For example, the media device 104 may communicate with the remote control using a Bluetooth personal area network.

The media device 104 may also include one or more busses or other internal communications hardware or software that allow for the transfer of data between the various modules and components of the media device 104.

As shown in FIG. 2, the media device 104 includes one or more memories 210. The memory 210 comprises one or more computer-readable storage media ("CRSM"). The buffer 134 may comprise a portion of the memory 210, a dedicated memory device, and so forth. The CRSM may be any one or more of an electronic storage medium, a magnetic storage medium, an optical storage medium, a quantum storage medium, a mechanical computer storage medium, and so forth. The memory 210 provides storage of computer readable instructions, data structures, program modules, and other data for the operation of the media device 104.

The memory 210 may include at least one operating system (OS) module 212. The OS module 212 is configured to manage hardware resource devices such as the I/O interfaces 204, the I/O devices 206, the communication interfaces 208, the device interfaces, and provide various services to applications or modules executing on the processors 202. Also stored in the memory 210 may be the communication module 122, the user interface module 128, the presentation module 130, and the frame interpolation module 132.

As described above, the communication module 122 is configured to establish and support communications between the media device 104 and other devices. The communication module 122 may access the communication interfaces 208 to exchange information. For example, the communication module 122 may be configured to request content 106 from the content server 120 using the network 118.

As described above, the user interface module 128 is configured to provide the user interface to the user 102 using the I/O devices 206 and accept inputs received from the I/O devices 206. The user interface may include one or more visual, audible, or haptic elements.

The presentation module 130 is configured to present content 106 on the media device 104 or another device communicatively coupled thereto, such as a television connection using HDMI. The presentation module 130 is configured to receive content 106 streamed from an external source device such as the content server 120 or another media device 104, such as in a peer-to-peer configuration.

The presentation module 130 is configured to present the video frames 112 in the buffer 134. The presentation module 130 may determine that one or more frames are unavailable for presentation. Unavailable frames may be those frames which are absent, such as having not yet been received, or which are corrupt or otherwise unusable for presentation. The presentation module 130 may call the frame interpolation module 132 to generate one or more interpolated frames 140 to present in place of the unavailable frames.

The frame interpolation module 132 may use one or more of the thumbnails 110, the independent frames 136, the dependent frames 138, the differential independent frames 142, or the metadata 108, to generate one or more interpolated frames 140. The techniques for generating the interpolated frames 140 are discussed in more detail below with regard to FIGS. 4-12.

Other modules 214 may be stored in the memory 210. For example, a digital rights management module may work in conjunction with the presentation module 130 to facilitate access to content 106.

The memory 210 may also include a datastore 216 to store information. The datastore 216 may use a flat file, database, linked list, tree, or other data structure to store the information. In some implementations, the datastore 216 or a portion of the datastore 216 may be distributed across one or more other devices including servers, network attached storage devices, and so forth.

The datastore 216 may store a portion of the content 106, such as that in the buffer 134. Other data 218 may also be stored, such as user preferences, account login information, and so forth.

Figure 3:
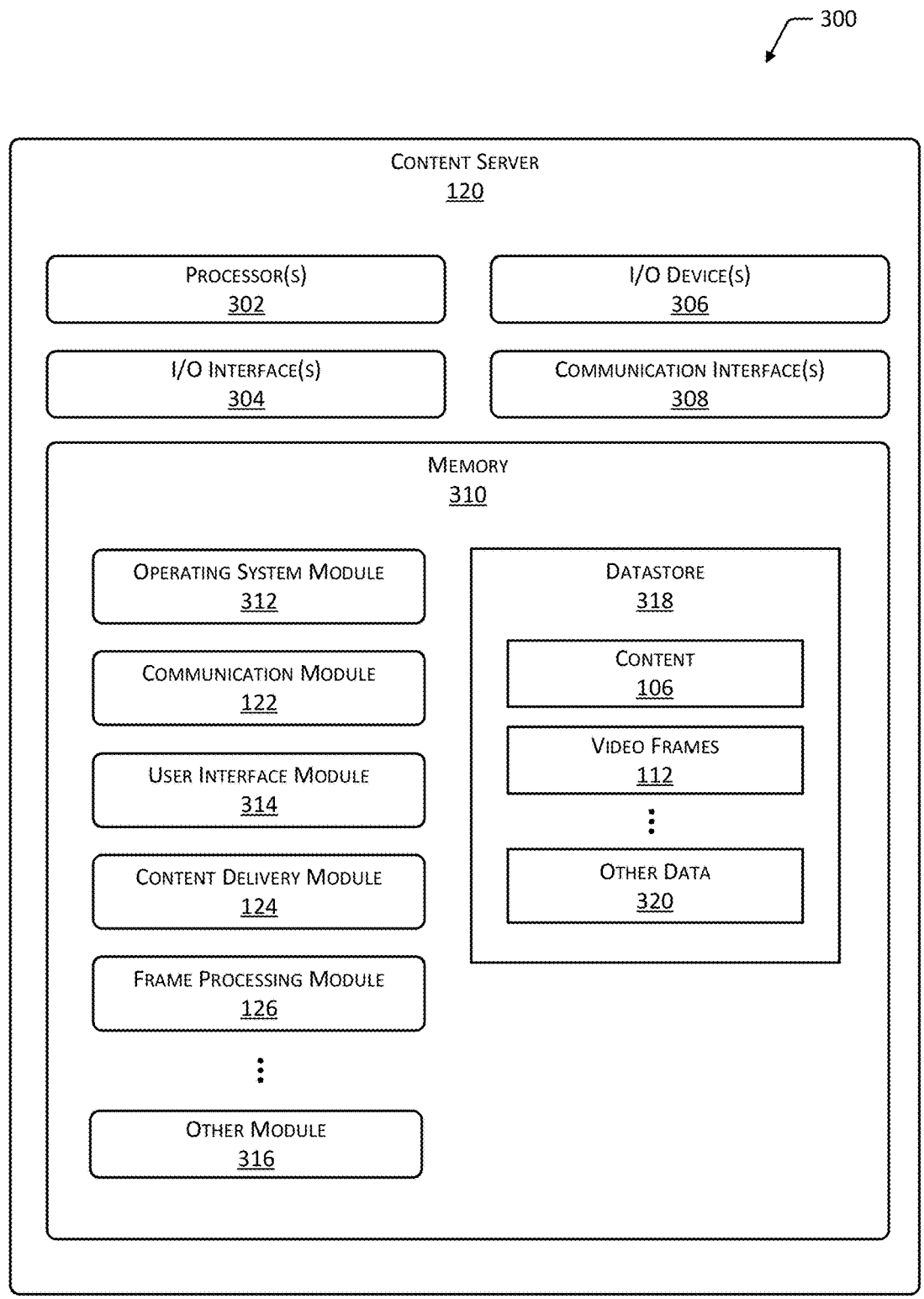
FIG. 3 illustrates a block diagram of a content server configured to deliver content to the media device.

FIG. 3 illustrates a block diagram 300 of the content server 120 configured to stream the content 106 to the media device 104. In some implementations, the content server 120 may be configured to generate thumbnails 110, differential independent frames 142, and so forth for distribution to the media device 104. The functions associated with the content server 120 described in this disclosure may be implemented by one or more servers, and by one or more entities. For example, in one implementation one server may provide and distribute the content 106 while another authenticates user account information. The one or more servers may be physical server devices or virtual servers executing on physical server devices.

The content server 120 may include one or more processors 302 configured to execute one or more stored instructions. The processors 302 may comprise one or more cores. The content server 120 may include one or more I/O interface(s) 304 to allow the processor 302 or other portions of the content server 120 to communicate with other devices. The I/O interfaces 304 may comprise I2C, SPI, USB, RS-232, and so forth.

The I/O interface(s) 304 may couple to one or more I/O devices 306. The I/O devices 306 may include input devices such as one or more of a keyboard, a touch sensor, and so forth. The I/O devices 306 may also include output devices such as one or more of a display, printer, and so forth. In some embodiments, the I/O devices 306 may be physically incorporated with the content server 120 or may be externally placed and communicatively coupled thereto.

The content server 120 may also include one or more communication interfaces 308. The communication interfaces 308 are configured to provide communications between the content server 120 and other devices such as the media device 104. The communication interfaces 308 may include wireless local area networks, wireless wide area networks, and so forth. For example, the communication interfaces 308 may include an Ethernet interface which connects to the network 118.

The content server 120 may also include one or more busses or other internal communications hardware or software that allow for the transfer of data between the various modules and components of the content server 120.

As shown in FIG. 3, the content server 120 includes one or more memories 310. The memory 310 comprises one or more CRSM. The memory 310 provides storage of computer readable instructions, data structures, program modules, and other data for the operation of the content server 120.

The memory 310 may include at least one operating system (OS) module 312. The OS module 312 is configured to manage hardware resource devices such as the I/O interfaces 304, the I/O devices 306, the communication interfaces 308, and so forth, and provide various services to applications or modules executing on the processors 302. Also stored in the memory 310 may be the communication module 122, a user interface module 314, the content delivery module 124, and the frame processing module 126.

As described above, the communication module 122 is configured to establish and support communications between the media device 104 and other devices. The communication module 122 may access the communication interfaces 308 to exchange information. For example, the communication module 122 may be configured to stream the content 106 to the media device 104 using the network 118.

The user interface module 314 is configured to provide a user interface to the user 102 or to the media device 104. In one implementation, the user interface may be a web interface presented via the network 118 and accessible to the users 102. In another implementation the user interface may comprise an application programming interface ("API") which enables communication such as sending requests for content 106 from the media device 104 to the content server 120.

As described above, the content delivery module 124 is configured to stream the content 106 to one or more of the media devices 104. The streaming of the content 106 may be initiated by a request from the media device 104, by the content server 120, or another device. For example, in some implementations the user 102 may use a third device to initiate streaming from the content server 120 and presentation on the media device 104.

In one implementation, the content server 120 may be configured to provide thumbnails 110, differential independent frames 142, or both to the media device 104. In this implementation, the content server 120 may execute the frame processing module 126 to generate this data.

Other modules 316 may be stored in the memory 310. For example, an authentication module may be configured to authorize delivery of the content 106 to a particular media device 104.

The memory 310 may also include a datastore 318 to store information. The datastore 318 may use a flat file, database, linked list, tree, or other data structure to store the information. In some implementations, the datastore 318 or a portion of the datastore 318 may be distributed across one or more other devices including servers, network attached storage devices, and so forth.

The datastore 318 may store the content 106 for distribution, including the video frames 112 such as differential independent frames 142, or other data 320. For example, the other data 320 may include administrator preferences, account information associated with the user 102, and so forth.

Illustrative Processes

Figure 4:
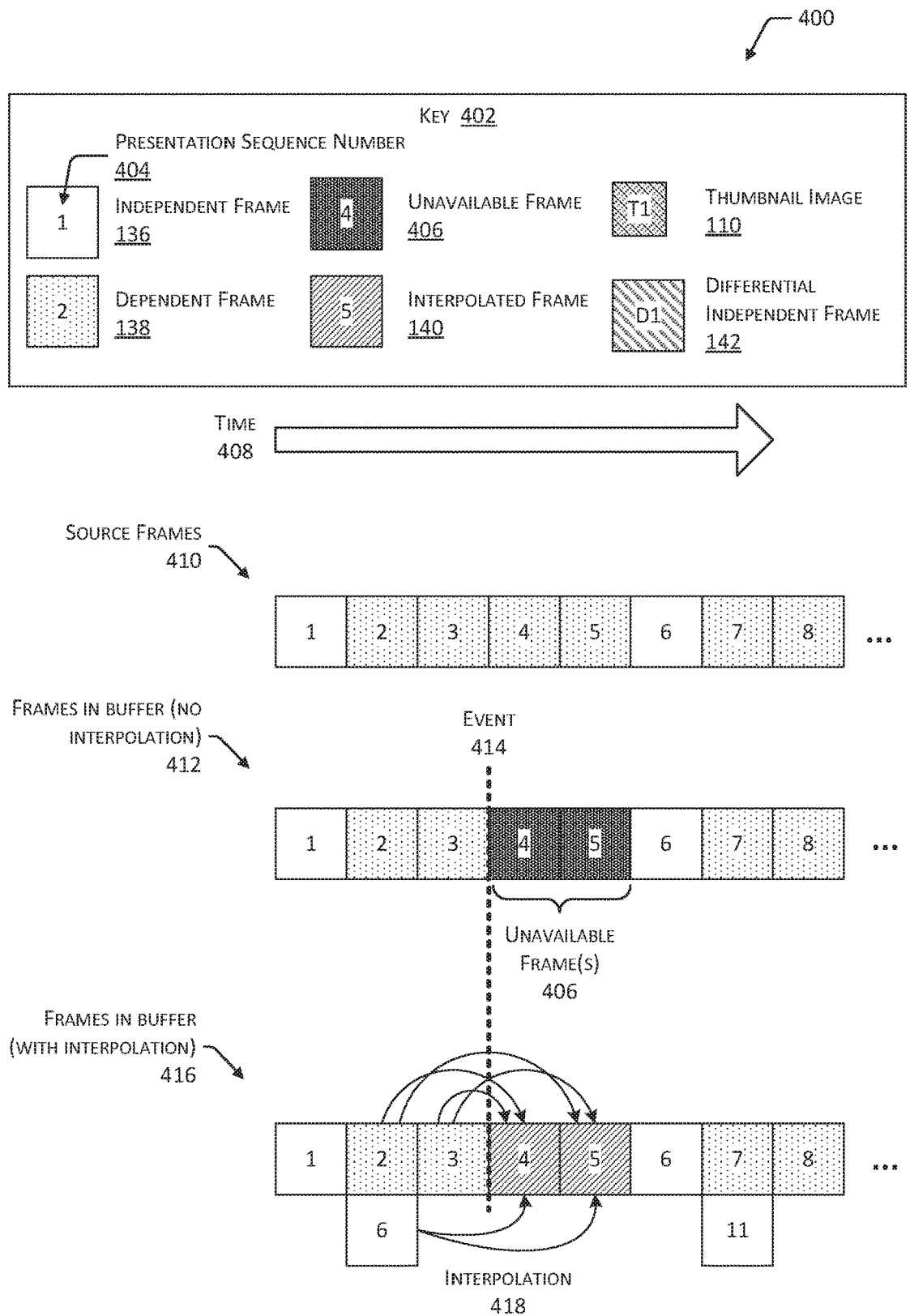
FIG. 4 illustrates source frames, such as stored on the content server, and frames in a buffer for presentation which have been generated by using interpolation based on independent frames delivered in advance.

FIG. 4 depicts an illustration 400 of source frames, such as stored on the content server 120, and presented video 144 using interpolation based on independent frames 136 delivered in advance.

A key 402 is depicted indicating graphic representations including presentation sequence numbers 404 of the independent frames 136, the dependent frames 138, unavailable frames 406, interpolated frames 140, thumbnail images 110, and differential independent frames 142. These graphic representations are used in the subsequent figures to indicate these different types of frames.

For ease of illustration, and not by way of limitation, some data associated with the video frames 112 is not depicted here. For example, the audio frames 114 which correspond to the video frames 112 are not shown, but may be provided to the media device 104. In another example, thumbnail images 110 may be provided to the media device 104.

In this illustration, time increases from left to right, as indicated by arrow 408. A plurality of source frames 410 are depicted. The source frames 410 may comprise "raw" or uncompressed video frames, compressed video frames, and so forth. The source frames 410 may be stored on the content server 120. In some implementations a plurality of different source frames 410 may be available for the same piece of content 106. For example, a first set of source frames 410 may be encoded at a first bitrate, a second set encoded at a second bitrate, and so forth. The content delivery module 124 may select which of these source frames 410 to deliver.

By way of illustration and not necessarily as a limitation, the source frames 410 comprise compressed data, including independent frames 136 at various intervals interspersed with dependent frames 138. The source frames 410 may be streamed to the media device 104 via the network 118 for presentation. However, as described above, the network 118, the media device 104, or other factors may result in unavailable frames 406. Unavailable frames 406 are those which would be presented by the presentation module 130 if available, but are unsuitable or not present in the buffer 134.

Frames in the buffer 134 with no interpolation 412 are depicted here, indicating their relative order of receipt by the media device 104 as time 408 increases. The source frames 410 are transmitted to the media device 104 generally in order, such that the independent frame 136(1) is received, followed by the dependent frames 138(2)-(5), followed by the independent frame 136(6), and so forth. Following an event 414, such as a change in quality being streamed due to operation of the ABS, corruption during transmission, and so forth, frames 4 and 5 become unavailable frames 406. During typical presentation, their absence would result in a stutter, dropout, or other presentation anomaly.

In comparison, frames in the buffer 134 with interpolation 416 are depicted. In this scenario, frames are delivered by the content server 120 out-of-sequence, such that independent frames 136 "lead" or are delivered in advance of some dependent frames 138. For example, as illustrated here, independent frame 136(1) is delivered first, followed by contemporaneous delivery of dependent frame 138(2) and independent frame 136(6). The transmission of the independent frames 136 may be offset to avoid exceeding the available bandwidth.

As time progresses, the event 414 occurs. The frame interpolation module 132 is used to perform the interpolation 418, generating the interpolated frames 140(4) and 140(5). The interpolation 418 may be based on the previously received frames, including the independent frame 136(6) which was delivered earlier.

The interpolation 418 may provide image interpolation, temporal interpolation, or both. This may include use of techniques such as motion estimation, optical flow, bilinear interpolation, bi-cubic interpolation, and so forth. By having the later independent frame 136(6), the interpolation may be more accurate and representative of the unavailable frames 406. For example, image interpolation techniques such as bi-linear or bi-cubic could be used. Based on the quality desired, the interpolation process may be extended to pixels or sub-pixels in the image domain. In another example, temporal interpolation may extend the interpolation to include more temporal frames. The extension to include additional temporal frames may be based on a desired quality of service in the image to be provided for presentation. Temporal interpolation may use both motion estimation and prediction techniques operating in conjunction with one another to predict motion velocity with a determined level of accuracy, and generate the interpolated frames 140 of the unavailable frames 406. One or both of the temporal or image interpolation techniques may be employed on lower resolution images, such as the thumbnail images 110. This may reduce computational complexity and may also serve to refine the results to the desired resolution or quality of service of the content 106 presentation.

Figure 5:
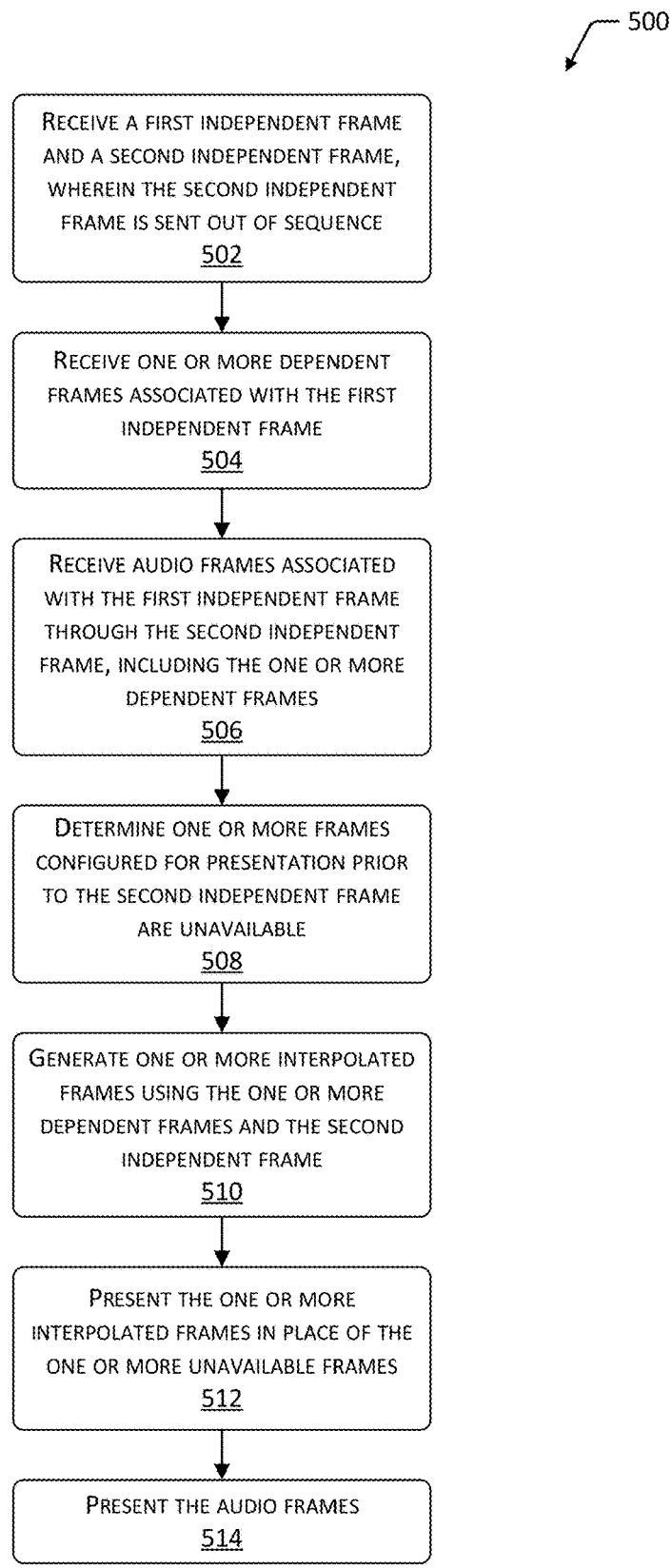
FIG. 5 is a flow diagram of a process of generating interpolated frames using independent frames delivered in advance.

FIG. 5 is a flow diagram 500 of a process of generating interpolated frames 140 using independent frames 136 delivered in advance. This process may be performed at least in part by the media device 104. The following diagrams reference particular presentation sequence numbers 404 for ease of illustration, and not by way of a limitation. For example, there may be 29 dependent frames 138 between two independent frames 136.

Block 502 receives a first independent frame 136(1) and a second independent frame 136(6). As described above, the independent frames 136 may comprise information configured to present an image without reference to another frame. The first independent frame 136(1) may be associated with a point in time in presentation of the content 106 which occurs before a point in time associated with the second independent frame 136(6). As a result, the second independent frame 136(6) may be deemed "out of sequence" relative to the order of presentation.

Block 504 receives one or more dependent frames 138 (2)-(3) associated with the first independent frame 136(1). As described above, the dependent frames 138 comprise information configured to present an image based on another frame, such as the independent frame 136. In this illustration, the source frames 410 include dependent frames 138 (2)-(5), but due to some event 414, some of the dependent frames have been rendered unavailable.

In some implementations, at least a portion of the one or more dependent frames 138(2)-(3) and the second independent frame 136(6) may be received contemporaneous with one another. For example, the dependent frame 138(2) and the second independent frame 136(6) may be received at approximately the same time.

Block 506 receives audio frames 114 associated with the first independent frame 136(1) through the second independent frame 136(6), including the one or more dependent frames 138(2)-(5). For example, the audio frames 114 which provide audio information extending from the point in time represented by the first independent frame 136(1) to the second independent frame 136(6) may be received. The audio frames 114 include audio associated with the unavailable frames 406(4)-(5), which correspond to the dependent frames 138(4)-(5). Because of the relatively small size of the audio frames 114, many frames worth of audio may be sent in advance of the corresponding video frames 112.

Block 508 determines one or more frames configured for presentation prior to the second independent frame 136 are unavailable frames 406. This determination may be made based on inspection of presentation sequence numbers 404 in the video frames 112, and so forth. As described above, the unavailable frames 406 may comprise dependent frames 138 scheduled for presentation but not yet received by the media device 104, or previously received dependent frames 138 which are corrupt or otherwise unsuitable for presentation.

Block 510 generates one or more interpolated frames 140(4)-(5) using the second independent frame 136(6) and one or more dependent frames 138(2)-(3). As described above, the dependent frames 138 may be based on or associated with the first independent frame 136(1).

Block 512 presents the one or more interpolated frames 140(4)-(5) in place of the one or more unavailable frames 406(4)-(5). By presenting the interpolated frames 140, stutters, dropouts, and so forth are avoided.

Block 514 presents the audio frames 114 associated with the one or more unavailable frames 406(4)-(5) during presentation of the one or more interpolated frames 140(4)-(5).

The process may continue on, receiving additional independent frames 136 in advance. For example, one or more dependent frames 138(7)-(10) associated with the second independent frame 136(6) may be received, along with a third independent frame 136(11). The second independent frame 136(6) and the corresponding dependent frames 138 (7)-(10) may then be presented, and so forth.

Figure 6:
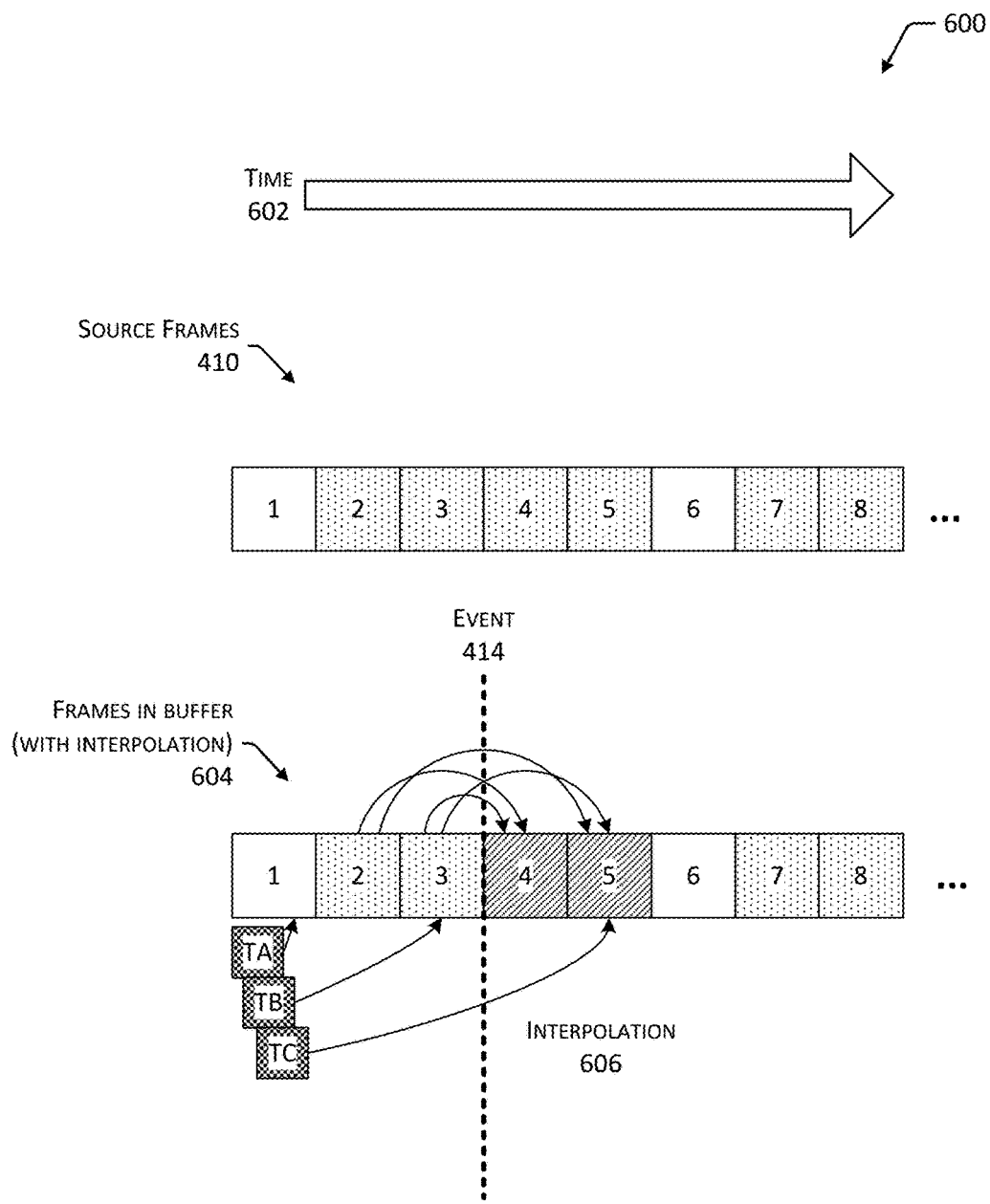
FIG. 6 illustrates frames in the buffer generated by using interpolation based on thumbnails delivered in advance.

FIG. 6 depicts an illustration 600 of frames in the buffer 134 generated by using interpolation 606 based on thumbnails 110 delivered in advance. As above, in this illustration, time increases from left to right, as indicated by arrow 602. The plurality of source frames 410 are depicted.

Frames in the buffer 134 with interpolation 604 are depicted. In this scenario, the content server 120 has provided a plurality of thumbnails 110 (TA-TC) associated with the video frames 112. The frame interpolation module 132 is configured to use one or more of the thumbnails 110 and previously received video frames 112 such as the independent frames 136, the dependent frames 138, or both, to extrapolate 606 and generate the interpolated frames 140. For example, as shown here the independent frame 136(1), the dependent frames 138(2)-(3), and the thumbnails 110 are used to generate the interpolated frames 140(4)-(5). These interpolated frames 140 are used to fill a gap resulting from the event 414, such as late video frame 112, corrupt video frame 112, and so forth.

In some implementations this technique may be combined with that discussed above with regard to FIGS. 4-5. For example, independent frames 136 may be delivered out of sequence, and thus be in the buffer 134 and available for the frame interpolation module 132.

Figure 7:
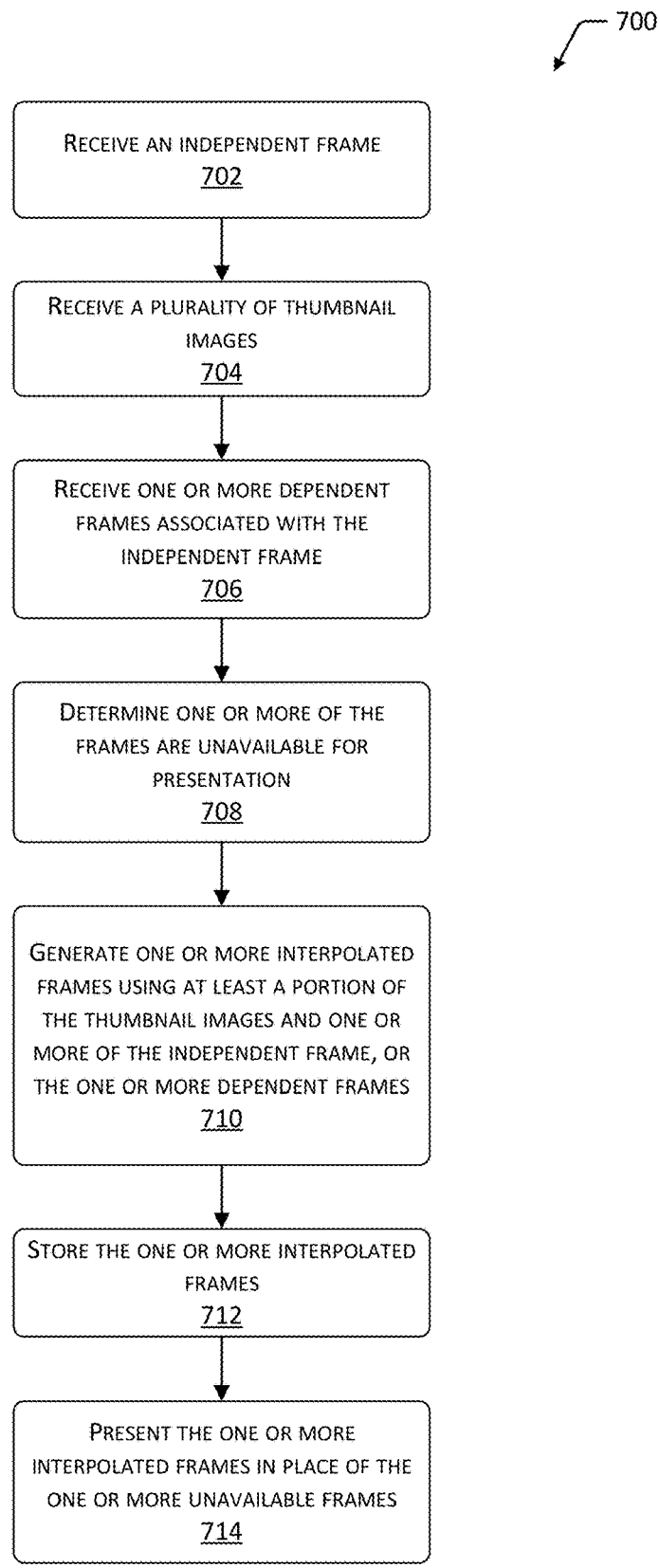
FIG. 7 is a flow diagram of a process of generating interpolated frames using thumbnails delivered in advance.

FIG. 7 is a flow diagram of a process of generating interpolated frames 140 using thumbnails 110 delivered in advance. This process may be performed at least in part by the media device 104.

Block 702 receives an independent frame 136 of video content 106.

Block 704 receives a plurality of thumbnail images 110. The thumbnail images 110 may comprise low resolution or low image frequency data of the source frames 410 in the video content 106. For example, a suitable 2-dimensional transform may be applied to an image or block of an image resulting in coefficients representing the high and low frequencies in the image. This data may be arranged in the form of a two-dimensional matrix. The coefficients may be arranged in the ascending order of frequencies represented in the image. The lower indexed coefficients represent low frequencies and most of the outline of the image, while the higher indexed coefficients represent the detail in the image. The amplitude of each of the coefficients represents the strength of the low and high frequency components in the image.

As described in this disclosure, dropping the high frequency coefficients still allows reconstruction of an image, although with low fidelity. The higher frequency coefficients may be used to reconstruct the image with a higher fidelity. Depending on the content of an image, the low and high frequency components will vary in strength. The number of coefficients representing an image will depend on the size of the block of the image and corresponding size of the transform that is applied.

Block 706 receives one or more dependent frames 138 associated with the independent frame 136. The thumbnail images 110 may be compressed using a first compression scheme and the independent frames 136 and the dependent frames 138 of the video content 106 may be compressed using a second compression scheme. For example, the thumbnail images 110 may be compressed using a wavelet compression technique, while the video frames 112 are compressed using a discrete cosine transform compression technique.

Block 708 determines one or more of the frames are unavailable for presentation. For example, the presentation module 130 may determine a video frame 112 scheduled for presentation is not present in the buffer 134.

Block 710 generates one or more interpolated frames 140 using at least a portion of the thumbnail images 110 and one or more of the independent frames 136, or the one or more dependent frames 138. As described above, the generating may include estimating motion of one or more objects depicted in the video frames 112, based on position of the objects within corresponding thumbnail images 110.

Block 712 stores the one or more interpolated frames 140. For example, the interpolated frames 140 may be stored in the buffer 134.

Block 714 presents the one or more interpolated frames 140 in place of the one or more unavailable frames 406.

In some implementations, additional blocks (not shown) may be configured to receive audio frames 114 associated with one or more unavailable frames 406. The audio frames 114 associated with the one or more unavailable frames 406 may be presented during presentation of the one or more interpolated frames 140.

In some situations, video frames 112 may arrive late, that is, after they were needed for presentation. The media device 104 may receive, after or during presentation of the one or more interpolated frames 140, the one or more frames determined as unavailable 406. These may be stored in the buffer 134 and the generating one or more interpolated frames 140 may use one or more of these late frames which were previously determined as unavailable frames 406.

This technique may be combined with that discussed above with regard to FIGS. 4-5. For example, one or more additional independent frames 136 of video content 106 may be received before the one or more associated dependent frames 138. The generating the one or more interpolated frames 140 may then use the additional independent frames 136.

Figure 8:
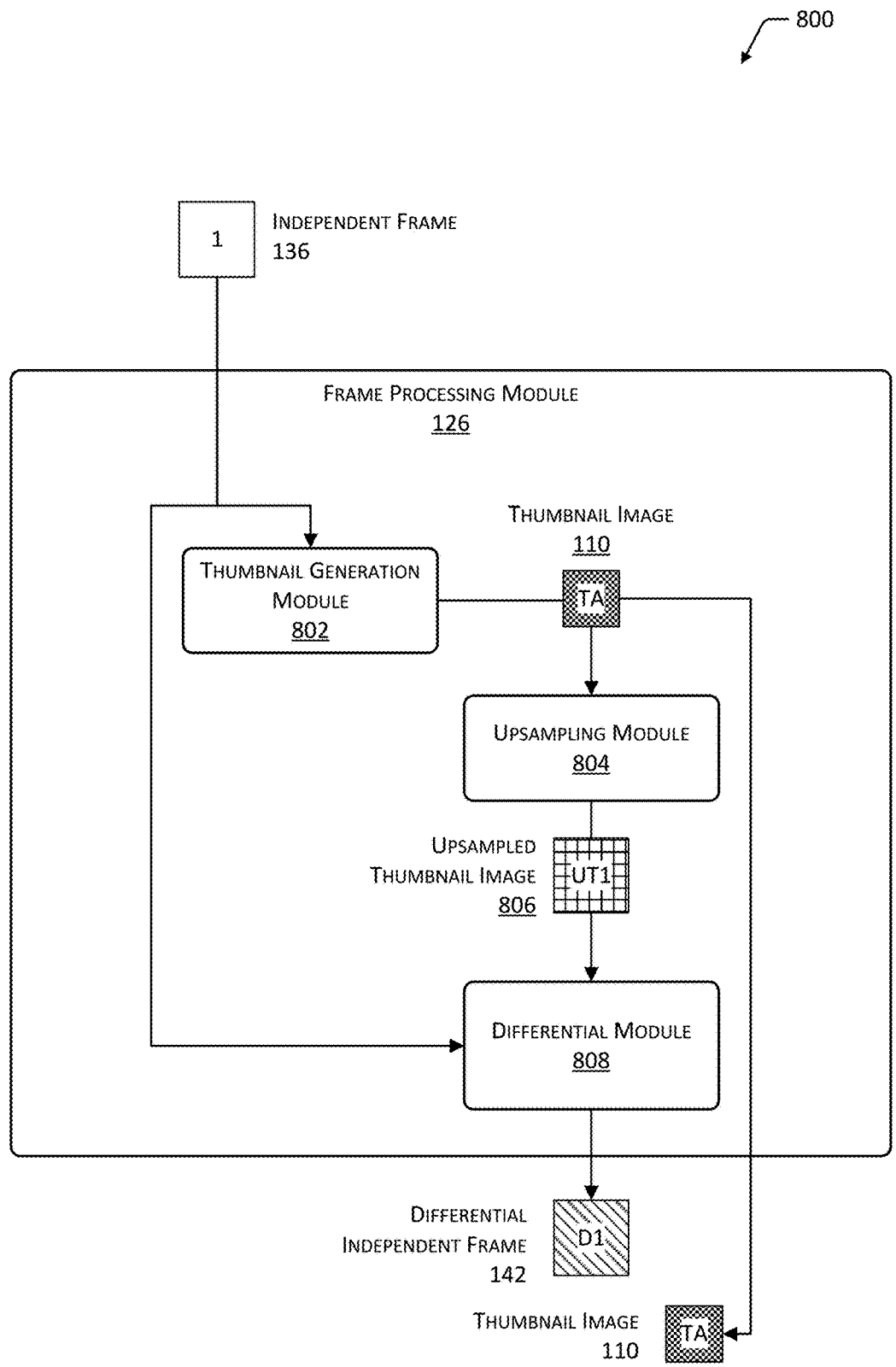
FIG. 8 depicts a frame processing module configured to generate differential independent frames and associated thumbnail images.

FIG. 8 depicts a schematic 800 of the frame processing module 126 configured to generate differential independent frames 142 and associated thumbnail images 110.

The independent frames 136 may comprise data which has been compressed, or raw or "uncompressed" data. In some implementations, the independent frames 136 may be suitable for additional compression. Furthermore, availability of thumbnail images 110 may be used to improve the user experience of the system 100. For example, the thumbnail images 110 may be presented to the user 102 to provide the ability to move within the content 106 to a particular point for playback. For example, the user 102 may wish to fast forward or rewind to a particular portion of the content 106.

Generation of the thumbnail images 110 and their correspondence to a respective video frame 112 may be used to facilitate generation of interpolated frames 140. The frame processing module 126 may be configured to operate on the content server 120 or another device. During operation, the frame processing module 126 accepts the independent frame 136 as input. A thumbnail generation module 802 generates a thumbnail image 110 from this input. The thumbnail image 110 may comprise an image expressed at a lower resolution than the independent frame 136 from which it was derived. For example, the thumbnail generation module 802 may downsample the independent frame 136 to produce the thumbnail image 110. The thumbnail generation module 802 may apply a compression technique to the thumbnail image 110. For example, wavelet compression may be used to reduce the size of the thumbnail image 110.

The thumbnail image 110 may be stored in memory. The content server 120 may provide at least a portion of the available thumbnail images 110 for the content 106 to the media device 104 during presentation of the content 106. As described above, these thumbnail images 110 may be used as inputs to the frame interpolation module 132 to generate interpolated frames 140. The thumbnail image 110 may express low image frequency information about the independent frame 136 which it is associated with.

In some implementations, the frame processing module 126 may be configured to generate differential independent frames 142. An upsampling module 804 accesses the thumbnail image 110 and generates an upsampled thumbnail image 806. The upsampled thumbnail image 806 is configured to have a resolution corresponding to the original independent frame 136. As with the thumbnail image 110, the upsampled thumbnail image 806 may comprise low image frequency information about the independent frame 136.

A differential module 808 accepts the independent frame 136 and the upsampled thumbnail image 806 as inputs. The differential module 808 determines a difference between the two and generates the differential independent frame 142. For example, the differential module 808 may subtract the upsampled thumbnail image 806 from the independent frame 136. The resulting differential independent frame 142 expresses high image frequency information about the independent frame 136. Data compression techniques may be applied to the differential independent frame 142 as well.

Because the differential independent frame 142 and the thumbnail image 110 exist beyond the scope of a video encoding standard such as MPEG2 or H.264, the compression used may be modified, optimized, and so forth, without affecting the underlying operation.

In some implementations, the thumbnail image 110 and the corresponding differential independent frame 142 may be provided to the media device 104 or other recipients instead of the independent frame 136. The media device 104 may decompress and use the differential independent frame 142 and the associated thumbnail image 110 to recreate the independent frame 136. In some implementations the compression may be lossy, in which case the independent frame 136 as reconstructed may not exactly match the independent frame 136 as input to the frame processing module 126. Generation of the independent frame 136 in this fashion is described below in more detail with regard to FIG. 10.

Figure 9:
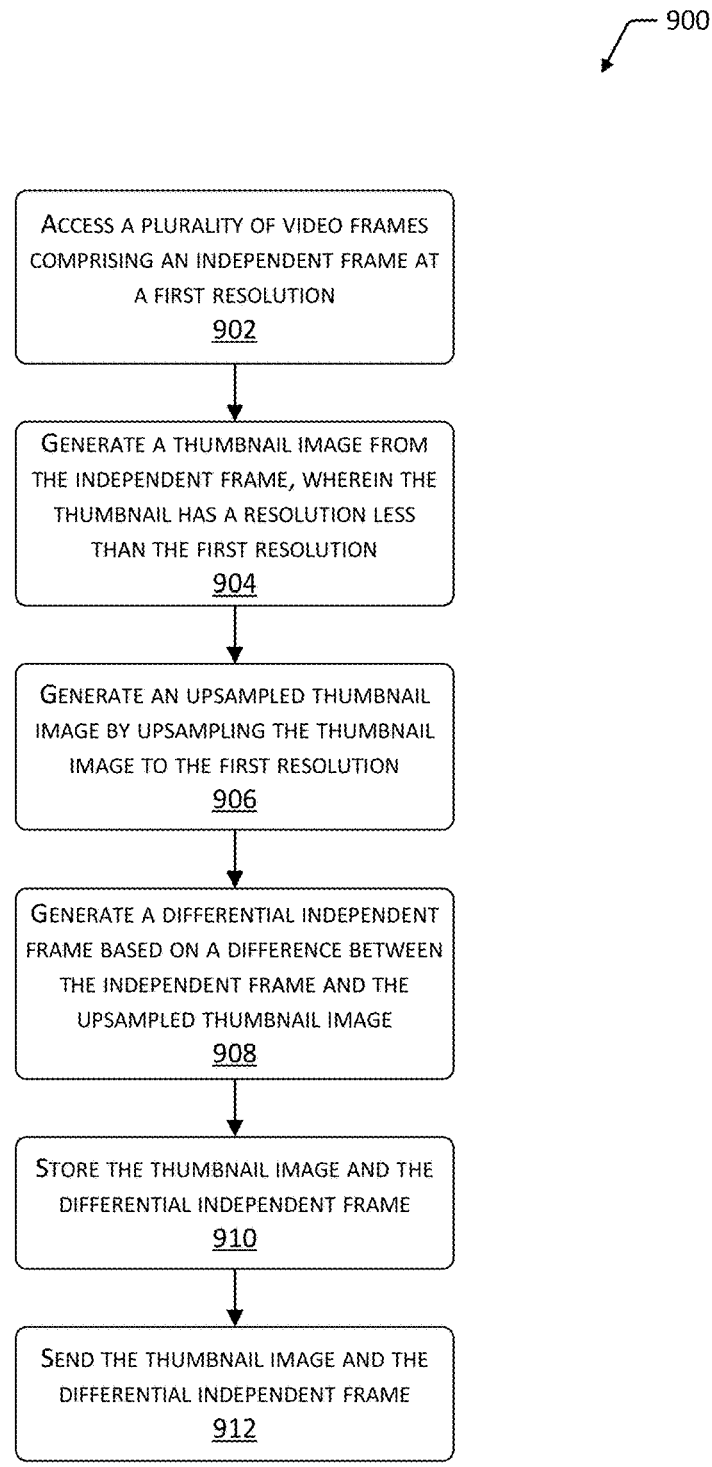
FIG. 9 is a flow diagram of a process of generating differential independent frames and associated thumbnail images.

FIG. 9 is a flow diagram 900 of a process of generating differential independent frames 142 and associated thumbnail images 110. This process may be performed at least in part by the content server 120.

Block 902 accesses a plurality of video frames 112 comprising an independent frame 136 at a first resolution. For example, the independent frame 136 may be at the "high definition" or "HD" resolution of 1920×1080 pixels.

Block 904 generates a thumbnail image 110 from the independent frame 136. The thumbnail image 110 has a resolution less than the first resolution of the independent frame 136. For example, the thumbnail image 110 may comprise a downsampled version of the independent frame 136. For example, the thumbnail image 110 may have a "standard definition" or "SD" resolution of 640×480 pixels. As described above, the thumbnail image 110 may comprise data representative of low image frequencies of the independent frame 136.

Block 906 generates an upsampled thumbnail image 806. As described above, this may comprise upsampling the thumbnail image 110 to the first resolution. Continuing the example, the upsampled thumbnail image 806 may have a resolution of 1920×1080.

Block 908 generates a differential independent frame 142 based on a difference between the independent frame 136 and the upsampled thumbnail image 806. As also described above, the differential independent frame 142 may comprise data representative of high image frequencies of the independent frame 136.

In one implementation, the difference may result from subtracting values associated with the upsampled thumbnail image 806 from the values associated with the independent frame 136.

Block 910 stores the thumbnail image 110 and the differential independent frame 142. For example, this data may be stored in the datastore 318. In some implementations the thumbnail image 110, the differential independent frame 142, or both may be compressed. The same or different compression schemes may be used for both.

Block 912 sends the thumbnail image 110 and the differential independent frame 142. For example, the content server 120 may send these to the media device 104.

Figure 10:
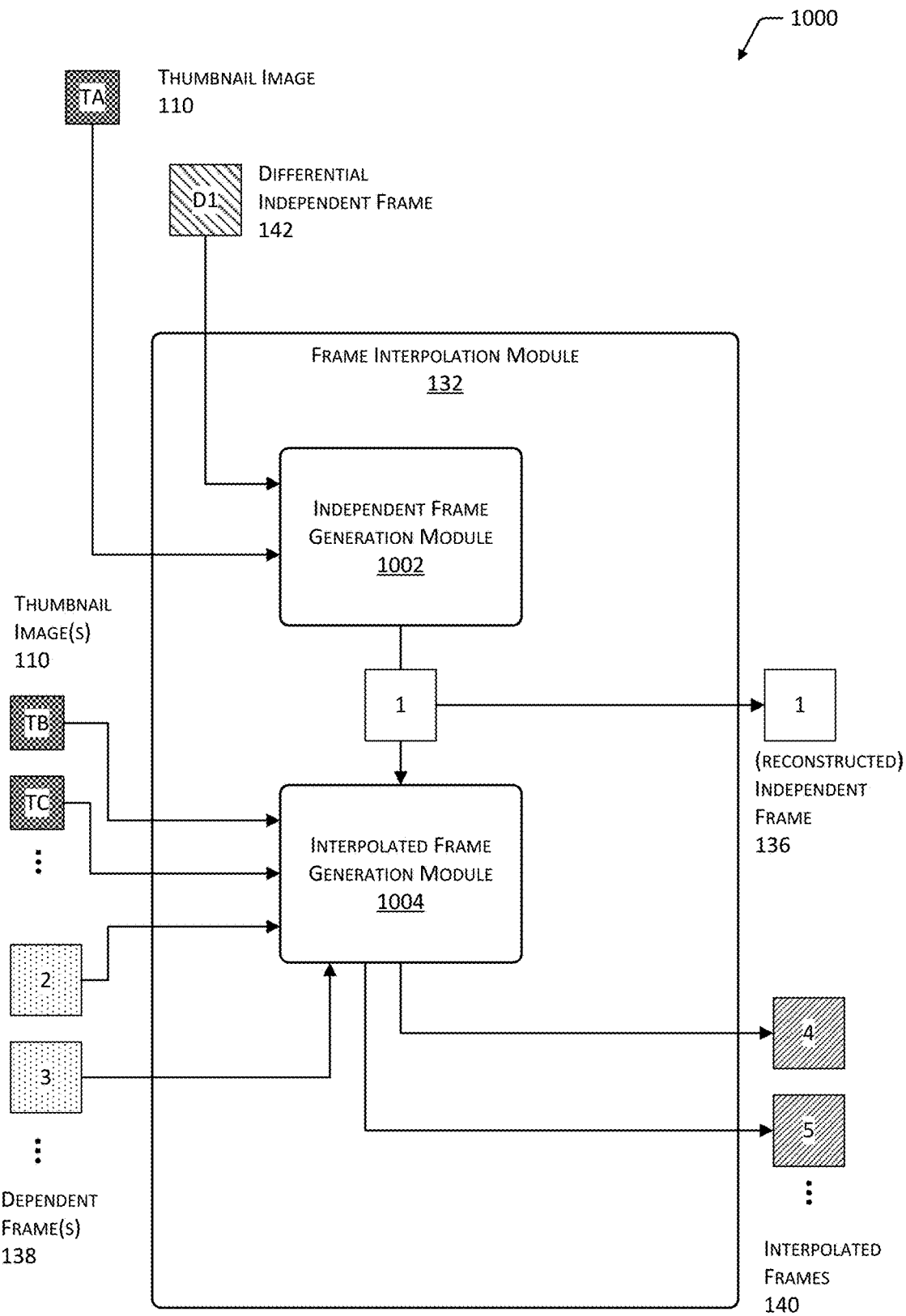
FIG. 10 depicts a frame interpolation module configured to generate independent frames using the differential independent frames and associated thumbnail images, as well as generating interpolated frames.

FIG. 10 depicts the frame interpolation module 132 configured to generate independent frames 136 using the differential independent frames 142 and associated thumbnail images 110. The frame interpolation module 132 may also generate the interpolated frames 140. The frame interpolation module 132 may execute at least in part on the media device 104.

The frame interpolation module 132 may include an independent frame generation module 1002. The independent frame generation module 1002 is configured to accept as inputs a differential independent frame 142 and an associated thumbnail image 110. As described above with regard to FIGS. 8-9, a differential independent frame 142 and associated thumbnail image 110 may be created from an independent frame 136 or another source frame 410.

The independent frame generation module 1002 is configured to upsample the thumbnail image 110 and combine the upsampled thumbnail image 110 and the differential independent frame 142 to generate a reconstructed independent frame 136. For example, the two images may be summed together. This independent frame 136 may then be stored in the buffer 134 and used for presentation by the presentation module 130.

In implementations where one or more compression techniques have been applied to the inputs, the independent frame generation module 1002 may be configured to provide decompression functionality. For example, the independent frame generation module 1002 may decompress differential independent frames 142 which have been compressed using wavelet compression techniques. In some implementations the thumbnail images 110 may also be decompressed.

The frame interpolation module 132 may include an interpolated frame generation module 1004. The interpolated frame generation module 1004 is configured to generate the interpolated frames 140 based at least in part on one or more of metadata 108, thumbnail images 110, independent frames 136, dependent frames 138, or other data. For example, the reconstructed independent frame 136, additional thumbnail images 110 corresponding to the unavailable frames 406, and so forth may be used as inputs. The interpolated frame generation module 1004 may use various techniques including motion estimation, optical flow, interpolation, and so forth to generate one or more of the interpolated frames 140.

The reconstructed independent frames 136 and the interpolated frames 140 may be stored in the buffer 134. As described above, the presentation module 130 may access the video frames 112 in the buffer 134 for presentation on the display output device.

Figure 11:
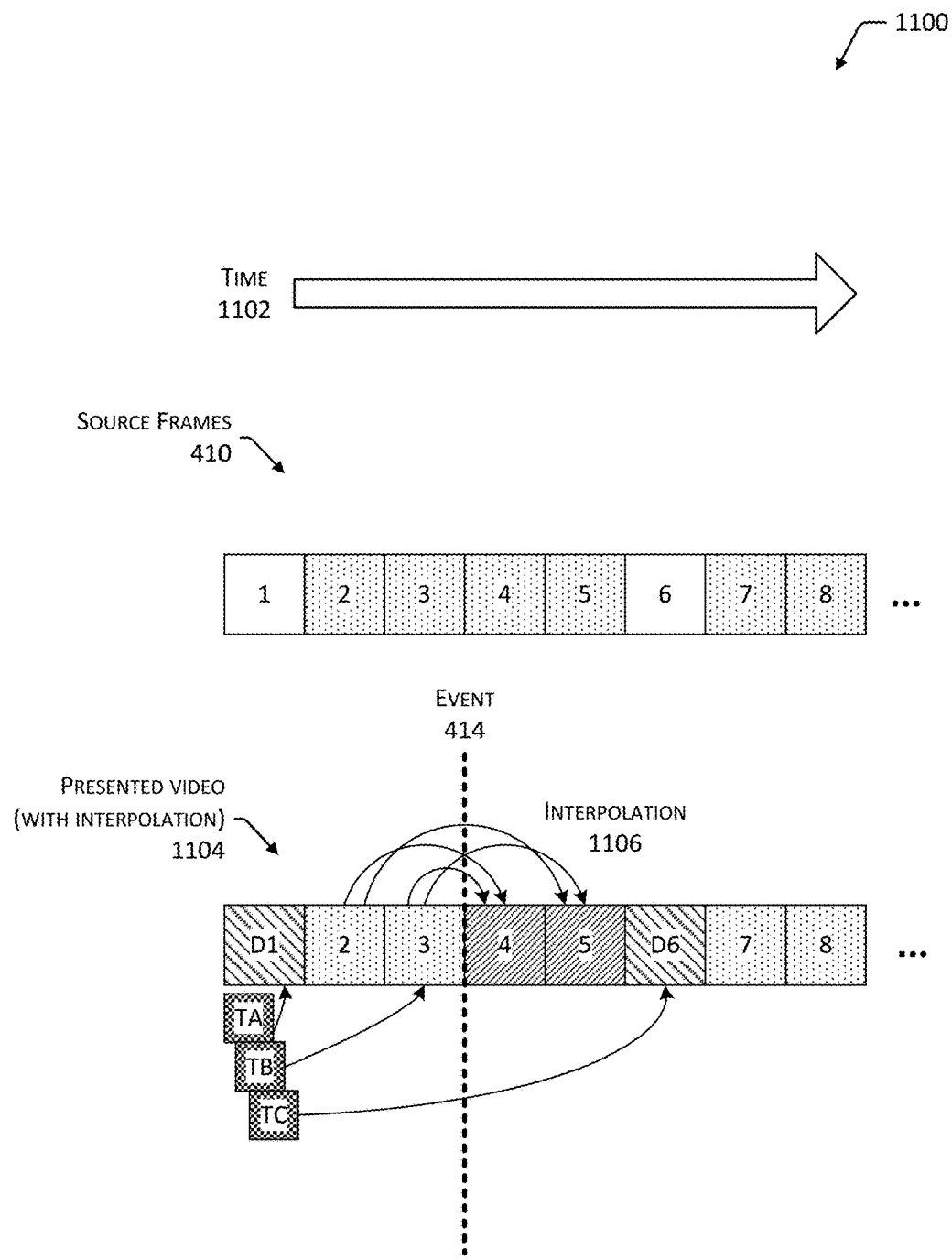
FIG. 11 illustrates frames in the buffer generated by using interpolation based on differential independent frames and thumbnails delivered in advance.

FIG. 11 depicts an illustration 1100 of frames in the buffer 134 generated by using interpolation based on differential independent frames 142 and thumbnail images 110 which have been delivered in advance of the event 414. As above, in this illustration, time increases from left to right, as indicated by arrow 1102. The plurality of source frames 410 are depicted.

Presented video (with interpolation) 1104 is depicted. In this scenario, the content server 120 has provided a plurality of thumbnails 110 associated with the video frames 112. Also provided are differential independent frames 142, instead of the independent frames 136. As described above, the differential independent frames 142 may use less bandwidth during transmission due to application of one or more compression techniques, and because additional information associated with the differential independent frame 142 are expressed in the associated thumbnail images 110.

The frame interpolation module 132 is configured to use one or more of the thumbnail images 110 and previously received video frames 112 such as the differential independent frames 142, the dependent frames 138, or both, to extrapolate 1106 and generate the interpolated frames 140. For example, as described above, the differential independent frame 142(D1) and associated thumbnail image 110(1) may be used to generate a reconstructed independent frame 136(1). The independent frame 136(1), the dependent frames 138(2)-(3), and the thumbnails 110(TA)-(TC) may be used to generate the interpolated frames 140(4)-(5). These interpolated frames 140 are used to fill a gap of unavailable frames 406 resulting from the event 414, such as late video frames 112, corrupt video frames 112, and so forth.

In some implementations this technique may be combined with those discussed above with regard to FIGS. 4-7. For example, one or more additional differential independent frames 142 of video content 106 may be received before the one or more associated dependent frames 138. The generating the one or more interpolated frames 140 may then use the additional differential independent frames 142.

Figure 12:
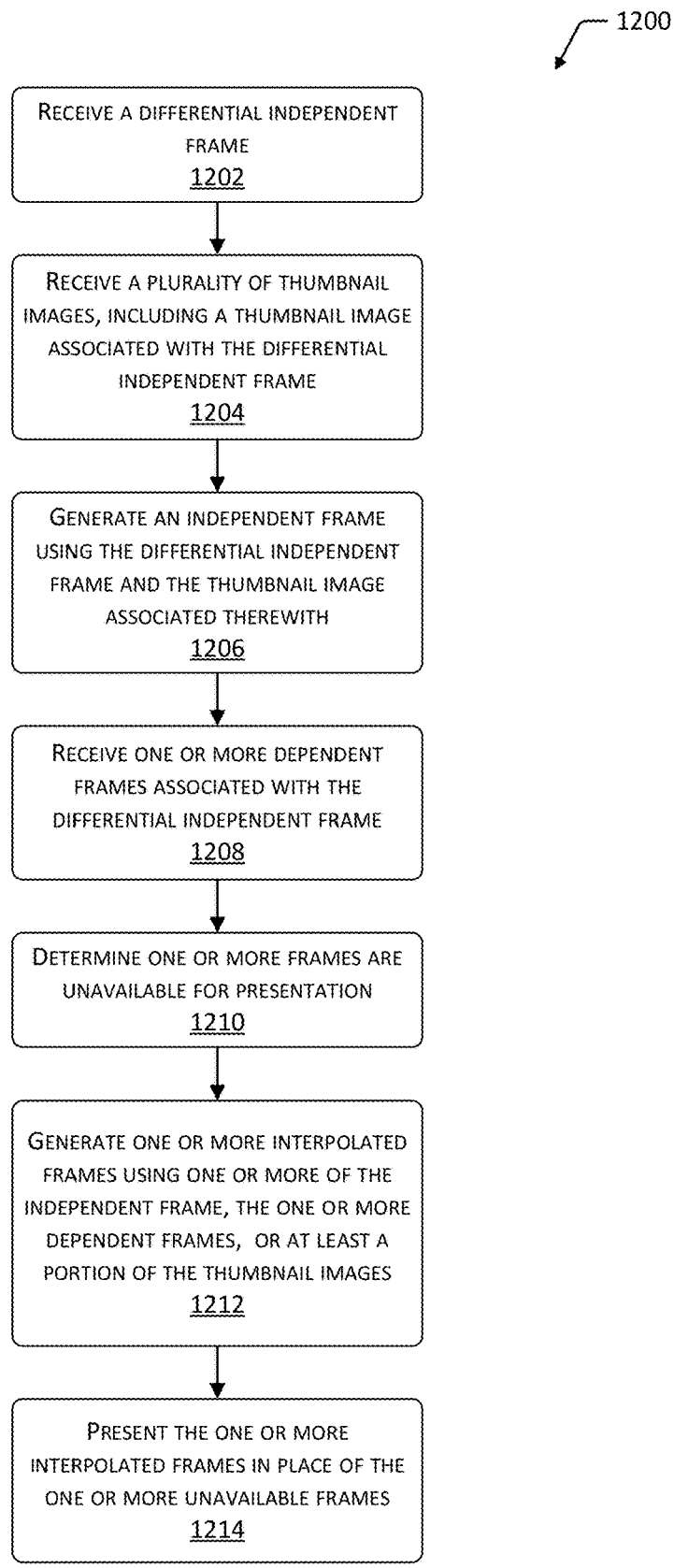
FIG. 12 is a flow diagram of a process of generating independent frames from the differential independent frames and associated thumbnail images, and generating interpolated frames therefrom.

FIG. 12 is a flow diagram 1200 of a process of generating independent frames 136 from the differential independent frames 142 and associated thumbnail images 110, and generating interpolated frames 140 therefrom. This process may be performed at least in part by the media device 104.

Block 1202 receives a differential independent frame 142. As described above, the differential independent frame 142 is derived from, or based on, a source frame 410. For example, the source frame 410 may comprise an independent frame 136. The differential independent frame 142 may comprise data representative of high image frequencies of the source frame 410, such as a high resolution version of the source frame.

In some implementations the differential independent frame 142 may be compressed. For example, a wavelet transform may be used to compress the differential independent frame 142. The associated thumbnail images 110 may also be compressed in some implementations. In these implementations, the differential independent frame 142, the thumbnail images 110, or both may be decompressed.

Block 1204 receives a plurality of thumbnail images 110, including a thumbnail image 110 associated with the differential independent frame 142. As described above, the thumbnail image 110 associated with the differential independent frame 142 may comprise image low frequency data of the source frame 410. In some implementations, at least a portion of the plurality of thumbnail images 110 may be received before the corresponding differential independent frame 142 or dependent frame 138 is presented, or scheduled for presentation. For example, the thumbnail images 110 may arrive in advance, and be stored in the memory before the differential independent frames 142 or dependent frames 138 which are indicative of the thumbnail images 110 is presented on the display.

Block 1206 generates an independent frame 136 using the differential independent frame 142 and the associated thumbnail image 110. For example, the differential independent frame 142 and the associated thumbnail image 110 may be summed as described above with regard to FIG. 10.

Block 1208 receives one or more dependent frames 138 associated with the differential independent frame 142. Block 1210 determines one or more frames are unavailable for presentation. For example, some of the dependent frames 138 may be unavailable frames 406. In some implementations the one or more differential independent frames 142 and the one or more dependent frames 138 may be received substantially in order of presentation. For example, these frames may be received in sequence of a presentation number, frame number, and so forth.

Block 1212 generates one or more interpolated frames 140. These interpolated frames 140 may be generated using one or more of: the independent frame 136, the one or more dependent frames 138, or at least a portion of the thumbnail images 110.

Block 1214 presents the one or more interpolated frames 140 in place of the one or more unavailable frames 406. As described above, by presenting the interpolated frames 140, stutters or other presentation anomalies may be eliminated or reduced, improving the user experience.

The interpolation techniques described above may be combined in various ways. In some implementations, some of the video frames 112 may be intentionally unavailable, using the interpolated frames 140 to reduce bandwidth requirements for a period of time. In one example, the content server 120 may prospectively not transmit some video frames 112 to provide additional bandwidth resources for use in transferring other data. Continuing the example, after initial video frames 112 have been sent, some video frames 112 may be omitted from transmission to provide additional bandwidth for transmission of additional audio frames 114. Because of the relatively small size of the audio frames 114 compared to the video frames 112, this technique may allow the buffering of many seconds of audio. As described above, these stored audio frames 114 may then be used to continue to provide audio associated with interpolated frames 140.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage medium may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method for streaming video comprising:
   receiving streaming video content comprising at least first and second differential independent frames, first and second dependent frames, and first and second thumbnail images, wherein:
   the first and second differential independent frames and the first and second dependent frames are received substantially in order of presentation;
   the first thumbnail image corresponds to the first differential independent frame;
   the second thumbnail image corresponds to the second differential independent frame;
   the first and second thumbnail images are received before the corresponding differential independent frames are presented;

the first thumbnail image corresponds to the first differential independent frame and a first source frame;
the first thumbnail image comprises a representation of the first source frame at a first resolution; and
the first differential independent frame comprises information relating to differences between the first source frame and the first thumbnail image;
generating a first independent frame using the first differential independent frame and the first thumbnail image, wherein the first independent frame has a second resolution and the second resolution is greater than the first resolution; and
presenting the first independent frame.

2. The computer-implemented method of claim 1, further comprising:
determining that another dependent frame is unavailable for presentation;
generating an interpolated frame using one or more of:
the first independent frame,
one or more dependent frames of the first and second dependent frames, or
the second thumbnail image; and
presenting the interpolated frame.

3. The computer-implemented method of claim 2, the generating the interpolated frame comprising one or more of image interpolation or temporal interpolation.

4. The computer-implemented method of claim 1, wherein the first differential independent frame is compressed using a wavelet transform; and the computer-implemented method further comprising:
decompressing the first differential independent frame.

5. The computer-implemented method of claim 1, wherein the first differential independent frame comprises data representative of high frequencies of the first source frame.

6. A computer-implemented method comprising:
receiving a first independent frame of video content having a first resolution;
receiving a first thumbnail image at a second resolution less than the first resolution, wherein the first thumbnail image is derived from a source frame of the video content;
receiving one or more dependent frames associated with the first independent frame;
receiving a second independent frame of the video content, wherein the second independent frame is associated with a point in time in presentation of the video content that occurs after a point in time associated with the first independent frame;
determining that a frame is unavailable; and
responsive to the determining that the frame is unavailable, generating an interpolated frame using the first thumbnail image and one or more of:
the first independent frame,
a first dependent frame of the one or more dependent frames, or
the second independent frame.

7. The computer-implemented method of claim 6, wherein the generating the interpolated frame comprises estimating motion of one or more objects depicted in the first thumbnail image, the first independent frame, or the first dependent frame.

8. The computer-implemented method of claim 6, further comprising:
determining that a dependent frame is the frame that is unavailable for presentation; and
presenting the interpolated frame in place of the dependent frame that is unavailable.

9. The computer-implemented method of claim 8, further comprising:
receiving, after or during presentation of the interpolated frame, the dependent frame; and
generating another frame using the dependent frame that is received.

10. The computer-implemented method of claim 6, wherein the first independent frame comprises a differential independent frame combined with a thumbnail image associated with the differential independent frame.

11. The computer-implemented method of claim 6, further comprising:
receiving audio frames; and
presenting the audio frames associated with the frame that is unavailable during presentation of the interpolated frame.

12. The computer-implemented method of claim 6, wherein the first thumbnail image is compressed using a first compression scheme, and wherein the first independent frame and the one or more dependent frames of the video content are compressed using a second compression scheme.

13. The computer-implemented method of claim 6, wherein the first independent frame and the one or more dependent frames are compatible with at least a portion of an MPEG-2 standard promulgated by the Motion Pictures Experts Group ("MPEG") or the H.264 standard developed by the Video Coding Experts Group and the MPEG.

14. A system comprising:
at least one communication interface;
memory storing computer-executable instructions; and
at least one processor communicatively coupled to the at least one communication interface and the memory, the at least one processor configured to execute the computer-executable instructions to:
access a plurality of video frames comprising an independent frame at a first resolution;
generate a thumbnail image from the independent frame, wherein the thumbnail image has a resolution less than the first resolution;
generate a differential independent frame based on a difference between the independent frame and the thumbnail image; and
store the thumbnail image and the differential independent frame.

15. The system of claim 14, wherein the thumbnail image comprises data representative of low frequencies, and wherein the differential independent frame comprises data representative of high frequencies.

16. The system of claim 14, further comprising computer-executable instructions to:
generate an upsampled thumbnail image by upsampling the thumbnail image to the first resolution; and
wherein the difference comprises subtracting values associated with the upsampled thumbnail image from values associated with the independent frame.

17. The system of claim 14, wherein the plurality of video frames is compressed using a first compression scheme, and further comprising computer-executable instructions to:
compress the differential independent frame using a second compression scheme.

18. The system of claim 14, further comprising computer-executable instructions to:
send the thumbnail image; and
send the differential independent frame after sending the thumbnail image.

19. The system of claim 14, further comprising computer-executable instructions to:
 send the thumbnail image and the differential independent frame to a media device configured to reconstruct the independent frame from the thumbnail image and the differential independent frame.

20. The computer-implemented method of claim 6, further comprising:
 generating an upsampled thumbnail image by upsampling the first thumbnail image to the first resolution.

\* \* \* \* \*